US011522620B2

(12) United States Patent
Hung et al.

(10) Patent No.: US 11,522,620 B2
(45) Date of Patent: Dec. 6, 2022

(54) METHOD FOR ADJUSTING ANTENNA AND COMMUNICATION DEVICE USING SAME

(71) Applicant: Nanning FuLian FuGui Precision Industrial Co., Ltd., Nanning (CN)

(72) Inventors: Chih-Yu Hung, Taipei (TW); Ming-Chieh Cheng, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 187 days.

(21) Appl. No.: 17/160,134

(22) Filed: Jan. 27, 2021

(65) Prior Publication Data
US 2022/0238997 A1   Jul. 28, 2022

(51) Int. Cl.
*H04B 17/10*  (2015.01)
*H04B 17/11*  (2015.01)

(52) U.S. Cl.
CPC ............ *H04B 17/103* (2015.01); *H04B 17/11* (2015.01)

(58) Field of Classification Search
CPC .............................. H04B 17/103; H04B 17/11
See application file for complete search history.

(56) References Cited

U.S. PATENT DOCUMENTS

| | | | | |
|---|---|---|---|---|
| 5,491,489 A | * | 2/1996 | Johnson | H01Q 19/17 343/853 |
| 7,353,020 B2 | * | 4/2008 | Saitou | H04W 52/24 455/67.11 |
| 7,457,587 B2 | * | 11/2008 | Chung | H01Q 1/241 343/893 |
| 10,009,895 B2 | * | 6/2018 | Nishikawa | H04B 17/318 |
| 2001/0007969 A1 | * | 7/2001 | Mizushima | G01S 3/8086 702/75 |
| 2003/0068993 A1 | * | 4/2003 | Miya | H04B 1/7117 455/272 |
| 2004/0014499 A1 | * | 1/2004 | Hamalainen | G01S 3/14 455/562.1 |
| 2015/0116155 A1 | | 4/2015 | Chibane et al. | |
| 2018/0219287 A1 | * | 8/2018 | Lyu | H01Q 25/00 |
| 2020/0119785 A1 | * | 4/2020 | Varatharaajan | H04B 7/0634 |
| 2020/0212991 A1 | * | 7/2020 | Cho | H04B 17/373 |
| 2021/0313678 A1 | * | 10/2021 | Shaffer | H01Q 3/08 |

FOREIGN PATENT DOCUMENTS

| | | |
|---|---|---|
| CN | 109149110 A | 1/2019 |
| TW | 201725785 A | 7/2017 |
| TW | 202032855 A | 9/2020 |

* cited by examiner

*Primary Examiner* — Dominic E Rego
(74) *Attorney, Agent, or Firm* — ScienBiziP, P.C.

(57) ABSTRACT

A method for adjusting direction of antenna for optimal radio reception, adapted to a communication device with a directional antenna. The method includes receiving a wireless signal output by a wireless signal source in a first direction at a predetermined location, and obtaining a first received power value corresponding to the first direction. A wireless signal output by the wireless signal source in a second direction is also received through the directional antenna and a second received power value corresponding to the second direction is also obtained. An optimal receiving angle according to the first received power value, the second received power value, a maximum gain value of the directional antenna, a first angle, and a second angle, is calculated and the direction of the directional antenna can be adjusted according to the optimal receiving angle.

8 Claims, 3 Drawing Sheets

METHOD FOR ADJUSTING ANTENNA AND COMMUNICATION DEVICE USING SAME

FIELD

A method for adjusting antenna and a communication device are disclosed, for achieving an optimal angle for receiving radio waves.

BACKGROUND

Communication devices with wireless networking capabilities are widespread. However, when the communication devices have poor signal reception, the users must adjust the antenna's receiving angle to improve communication quality. In the absence of reference data, it is hard to accurately find the most suitable receiving direction. In addition, the current methods for detecting signal strength usually use RSSI technology which takes a lot of calculating time, and it is not suitable for general users. Adjusting the antenna angle in a simpler way is desirable.

BRIEF DESCRIPTION OF THE DRAWINGS

Implementations of the present technology will now be described, by way of example only, with reference to the attached figures, wherein.

DETAILED DESCRIPTION

Further areas of application will become apparent. It should be understood that the detailed description and specific examples, while indicating exemplary embodiments, are intended for purposes of illustration only and are not intended to limit the scope of the claims.

Figure 1:
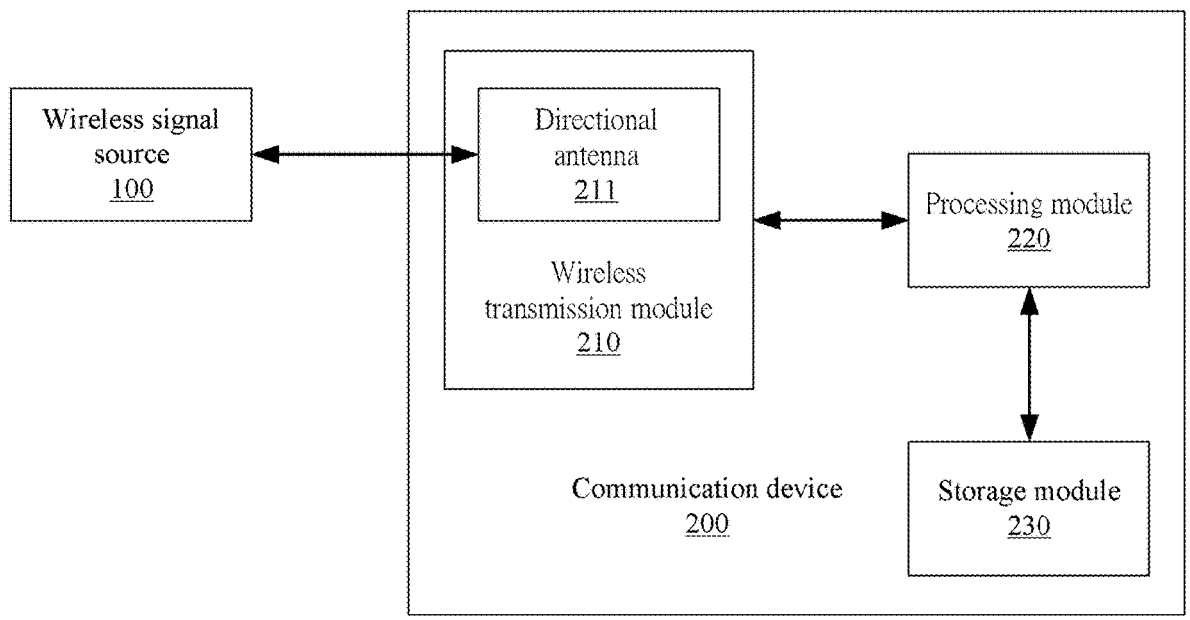
FIG. 1 is a block diagram of a communication system 10 in accordance with an embodiment.

FIG. 1 is a block diagram of a communication system 10 in accordance with an embodiment of the disclosure. The communication system 10 at least includes a wireless signal source 100 and a communication device 200. The wireless signal source 100 and the communication device 200 communicate with each other through radio frequency signals. The communication device 200 may be a networking device such as a smart phone, a tablet, or a notebook, and at least includes a wireless transmission module 210, a processing module 220, and a storage module 230. The wireless transmission module 210 includes at least one directional antenna 211 for receiving wireless signals from the wireless signal source 100 in at least two different directions at a predetermined location, and outputting a received power value corresponding to each receiving direction. The processing module 220 is used to obtain the received power values from the wireless transmission module 210, and calculates an optimal receiving angle and a distance between the wireless signal source 100 and the communication device 200 according to parameters such as the received power values, an angle between the two receiving directions, a direction of maximum gain and a direction of minimum gain of the directional antenna 211, etc. The processing module 220 can be, for example, dedicated hardware circuits or general-purpose hardware (e.g., a single processor, a multi-processor with parallel processing capabilities, a graphics processor, or other computing capabilities processor), and is able to provide the functions described below when executing the code or software. The storage module 230 can be a non-volatile storage device such as a hard disk, a flash drive, etc., which is used to store optimal receiving angles corresponding to different wireless signal sources, and the formulas and related parameters required to perform the aforementioned calculations, etc.

Moreover, the communication device 200 may further include a display module or a sound module (not shown in FIG. 1) for outputting an indication signal, such as an arrow indicator or a sound guide.

Figure 2:
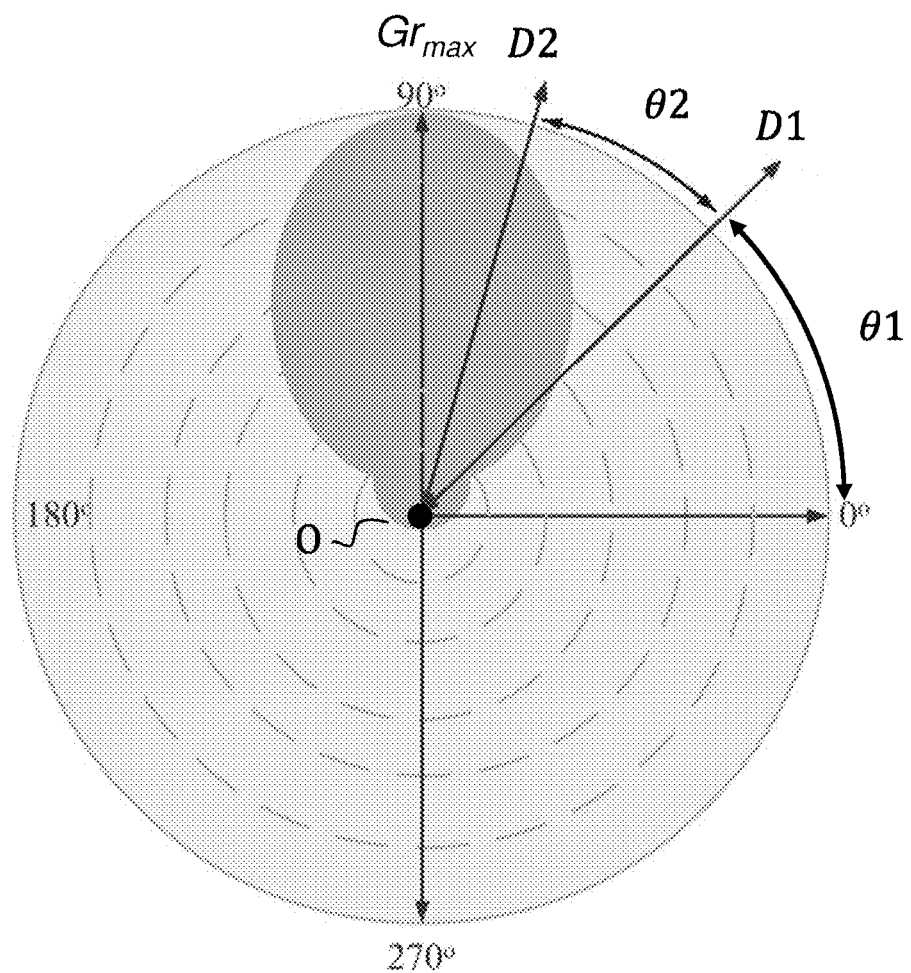
FIG. 2 is a schematic diagram of a communication device 200 receiving wireless signals from different directions in accordance with an embodiment.

FIG. 2 is a schematic diagram of a communication device 200 receiving wireless signals from different directions in accordance with an embodiment. In this embodiment, the directional antenna 211 first receives the wireless signal output by the wireless signal source 100 in the first direction D1 at the predetermined location O, and obtains the first received power value Pr1 corresponding to the first direction D1. Because of the direction of the maximum gain and the direction of the minimum gain of the directional antenna 211 are both known, the processing module 220 may obtain the first angle θ1 between the first direction D1 and the direction of the minimum gain of the directional antenna 211. Next, the directional antenna 211 is rotated from the first direction D1 by a second angle θ2 to the second direction D2 at the predetermined location O, and then the wireless signal is then received from the wireless signal source 100 in the second direction D2. The second received power value Pr2 is thus obtained. The first received power value Pr1 and the second received power value Pr2 can be obtained through a chip in the wireless transmission module 210 by using Fast Fourier Transform algorithm. Since a first gain value Gr1 corresponding to the first direction D1 and a second gain value Gr2 corresponding to the second direction D2 can be calculated based on the first received power value Pr1, the second received power value Pr2, a transmitter power Pt, a transmitter gain Gt, and a path loss L, a difference between the first gain value Gr1 and the second gain value Gr2 will be equal to a difference between the first received power value Pr1 and the second received power value Pr2 if the distance from the wireless signal source 100 does not change. Then, on the premise that the second angle θ2 is known, the processing module 220 may further obtain the first gain value Gr1 and the second gain value Gr2 according to the first angle θ1, the second angle θ2, and the maximum gain value Grmax of the directional antenna 211. Thereby, the optimal receiving angle corresponding to the direction of the maximum gain can be calculated. It should be noted that the first angle θ1 and the second angle θ2 shown in FIG. 2 are only an examples, a size of angle and a rotation direction can be defined by users according to needs, and it is not limited thereto.

For example, according to following formulas (1)-(3) with reference to FIG. 2, the difference between the second gain value Gr2 and the first gain value Gr1 is equal to the difference between the second received power value Pr2 and the first received power value Pr1 when the distance between the wireless signal source 100 and the communication device 200 is unchanged.

$$Gr1 = Pr1 - Pt - Gt + L \qquad \text{(formula (1))}$$

$$Gr2 = Pr2 - Pt - Gt + L \qquad \text{(formula (2))}$$

$$Gr2 - Gr1 = Pr2 - Pr1 \qquad \text{(formula (3))}$$

Furthermore, according to following formulas (4) and (5), the first gain value Gr1 and the second gain value Gr2 can be obtained according to the first angle θ1. Therefore, by using the formulas (3) and (6), the difference between the second gain value Gr2 and the first gain value Gr1 can be calculated in two different ways. One, the processing module 220 may obtain the first angle θ1 when the difference between the second received power value Pr2 and the first received power value Pr1, the rotation angle (i.e., the second angle θ2), and the maximum gain value Grmax are all known. Secondly, the processing module 220 may obtain the angle between the maximum gain direction of the directional antenna 211 and the first direction D1 (i.e., the optimal receiving angle) according to the first angle θ1. In either case, the processing module 220 may further instruct the user to turn the communication device 200 towards the optimal receiving angle through the display module or the sound module by using the arrow indicator or the sound guide.

$$Gr1 = \frac{\theta_1}{90} Gr_{max} \quad \text{(formula (4))}$$

$$Gr2 = \frac{90 - \theta_1 - \theta_2}{90} Gr_{max} \quad \text{(formula (5))}$$

$$\frac{90 - \theta_1 - \theta_2}{90} Gr_{max} - \frac{\theta_1}{90} Gr_{max} = Pr2 - Pr1 \quad \text{(formula (6))}$$

According to another embodiment, after obtaining the first angle θ1 between the first direction D1 and the minimum gain direction, the processing module 220 further calculates the distance according to the formula (1) and formula (7), where L is the path loss, f is a transmission frequency, N is a distance power loss coefficient, d is the distance between the communication device and the wireless signal source, and pf(n) is a floor loss penetration factor. Since the first gain value Gr1, the first received power Pr1, the transmitter power Pt, the transmitter gain Gt, the transmission frequency f, the distance power loss coefficient N, and the floor loss penetration factor pf(n) can all be obtained from manufacturer, the processing module 220 can calculate the distance d according to the above-mentioned parameters and formulas (1) and (7). It should be noted that the distance power loss coefficient N will vary with the location of the communication device 200 and the bandwidth of the signal. For example, indoor use, outdoor use, and different bandwidths used correspond to different distance power loss coefficients.

$$L = 20 \log_{10} f + N \log_{10} d + p_f(n) \quad \text{(formula (7))}$$

Figure 3:
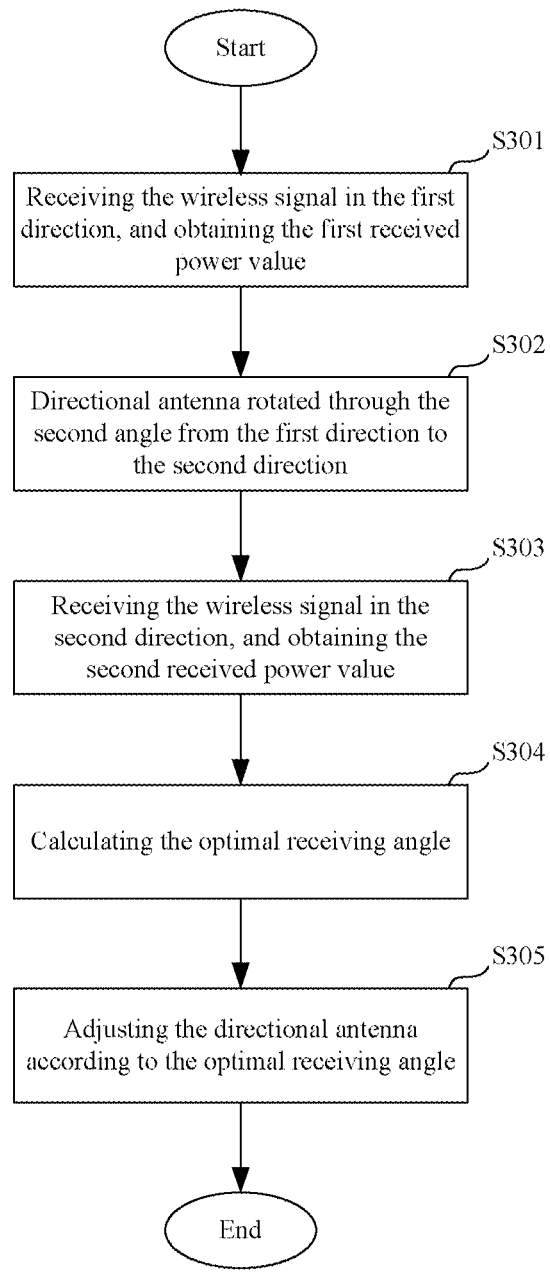
FIG. 3 is a flowchart of a method of adjusting antenna in accordance with an embodiment.

FIG. 3 is a flowchart of a method of adjusting an antenna in accordance with an embodiment. At step S301, the directional antenna 211 receives at predetermined location O the wireless signal output by the wireless signal source 100 in the first direction D1, and obtains the first received power value Pr1 corresponding to the first direction D1. At step S302, the directional antenna 211 at predetermined location O is rotated through second angle θ2 from the first direction D1 to the second direction D2. At step S303, the directional antenna 211 receives the wireless signal output by the wireless signal source 100 in the second direction D2, and obtains the second received power value Pr2. At step S304, the processing module 220 obtains the first angle θ1 between the first direction D1 and the minimum gain direction corresponding to the directional antenna 211, and calculates an optimal receiving angle according to the first received power value Pr1, the second received power value Pr2, the maximum gain value Grmax, and the first angle θ1. At step S305, the processing module 220 outputs an instruction to adjust the directional antenna 211 according to the optimal receiving angle.

It should be noted that although the method as described above has been described through a series of steps or blocks of a flowchart, the process is not limited to any order of the steps, and some steps may be different from the order of the remaining steps or the remaining steps can be done at the same time. In addition, those skilled in the art should understand that the steps shown in the flowchart are not exclusive, other steps may be included, or one or more steps may be deleted without departing from the scope of the claims.

In summary, according to the embodiments and the techniques employed, the communication device may calculate an optimal receiving angle by detecting as the receiving device the power values corresponding to different receiving angles without connecting with other wireless devices. Furthermore, the user can be given instructions through the display module or the sound module to provide the user with a better wireless connection experience.

It will be apparent to those skilled in the art that various modifications and variations can be made to the structure disclosed without departing from the scope or spirit of the claims. In view of the foregoing, it is intended that the present disclosure covers modifications and variations, provided they fall within the scope of the following claims and their equivalents.

What is claimed is:

1. A method for adjusting antenna, adapted to a communication device with a directional antenna, the method comprising the steps of:

receiving a wireless signal output by a wireless signal source in a first direction through the directional antenna at a predetermined location, and obtaining a first received power value corresponding to the first direction, wherein a first angle is between the first direction and a direction of minimum gain corresponding to the directional antenna;

receiving the wireless signal output by the wireless signal source in a second direction through the directional antenna at the predetermined location, and obtaining a second received power value corresponding to the second location, wherein a second angle is between the first direction and the second direction;

calculating an optimal receiving angle according to the first received power value, the second received power value, a maximum gain value of the directional antenna, the first angle, and the second angle; and adjusting the directional antenna according to the optimal receiving angle.

2. The method as claimed in claim 1, the method further comprising the step of:

obtaining the first received power value and the second received power value through a Fast Fourier Transform algorithm.

3. The method as claimed in claim 1, the method further comprising the step of:

calculating a distance between the communication device and the wireless signal source according to the optimal receiving angle, path loss corresponding to the predetermined location, and one of the first received power value and the second received power value.

4. The method as claimed in claim 3, the method further comprising the step of:

calculating the distance according to a following formula:

$$L = 20 \log_{10} f + N \log_{10} d + p_f(n)$$

wherein "L" is the path loss, "f" is a transmission frequency, "N" is a distance power loss coefficient, "d" is the distance between the communication device and the wireless signal source, and "pf(n)" is a floor loss penetration factor.

5. A communication device, comprising:
- a directional antenna, adapted for receiving a wireless signal output by a wireless signal source in a first direction and a second direction respectively at a predetermined location, wherein a first angle is between the first direction and a direction of minimum gain corresponding to the directional antenna, and a second angle is between the first direction and the second direction; and
- a processing module, adapted for obtaining a first received power value corresponding to the first direction and a second received power value corresponding to the second direction, and calculating a optimal receiving angle according to the first received power value, the second received power value, a maximum gain value of the directional antenna, the first angle and the second angle.

6. The communication device of claim 5, wherein the processing module further obtains the first received power value and the second received power value through a Fast Fourier Transform algorithm.

7. The communication device of claim 5, wherein the processing module further calculates a distance between the communication device and the wireless signal source according to the optimal receiving angle, path loss corresponding to the predetermined location, and one of the first received power value and the second received power value.

8. The communication device of claim 7, wherein the processing module further calculates the distance according to a following formula:

$$L = 20 \log_{10} f + N \log_{10} d + p_f(n)$$

wherein "L" is the path loss, "f" is a transmission frequency, "N" is a distance power loss coefficient, "d" is the distance between the communication device and the wireless signal source, and "pf(n)" is a floor loss penetration factor.

\* \* \* \* \*